(12) United States Patent
Kaneko

(10) Patent No.: US 12,705,806 B2
(45) Date of Patent: Aug. 11, 2026

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Chiaki Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 18/974,443

(22) Filed: Dec. 9, 2024

(65) Prior Publication Data

US 2025/0191250 A1 Jun. 12, 2025

(30) Foreign Application Priority Data

Dec. 12, 2023 (JP) ................................ 2023-209192

(51) Int. Cl.

*G06T 11/10* (2026.01)
*G06T 7/62* (2017.01)
*G06T 7/70* (2017.01)
*G06T 7/90* (2017.01)

(52) U.S. Cl.

CPC ................ *G06T 11/10* (2026.01); *G06T 7/62* (2017.01); *G06T 7/70* (2017.01); *G06T 7/90* (2017.01); *G06T 2207/10024* (2013.01); *G06T 2207/30244* (2013.01); *G06T 2210/62* (2013.01)

(58) Field of Classification Search

USPC ......................................................... 345/419
See application file for complete search history.

(56) References Cited

U.S. PATENT DOCUMENTS

2021/0104052 A1* 4/2021 Hayashi .................. G06T 7/248
2022/0277674 A1* 9/2022 Yanai ..................... G09G 3/002
2022/0321855 A1* 10/2022 Aizawa .................. H04N 23/90

OTHER PUBLICATIONS

Bangbang Yang et al., “Learning Object-Compositional Neural Radiance Field for Editable Scene Rendering”, Zhejiang University, Google Research, and Chinese University of Hong Kong; International Conference on Computer Vision, Oct. 2021.
Ben Mildenhall et al., “NeRF: Representing Scenes as Neural Radiance Fields for View Synthesis”, UC Berkeley, Google Research, and UC San Diego; European Conference on Computer Vision, pp. 1-25, Aug. 3, 2020, arXiv:2003.08934v2.

* cited by examiner

*Primary Examiner* — James A Thompson
*Assistant Examiner* — Kim Thanh T Tran
(74) *Attorney, Agent, or Firm* — Canon U.S.A., Inc. IP Division

(57) ABSTRACT

The computation amount or memory usage in a case of estimating a radiance field with high accuracy regarding an target object is reduced. An information processing apparatus of the present disclosure obtains captured images data obtained by capturing objects in a space from viewpoints and camera parameters corresponding to the viewpoints, regarding an target object of the objects, obtains information indicating a likelihood that an image formed on each pixel in each captured image is the target object as a likelihood value corresponding to each pixel in each captured image for each target object, and estimates information on the space including color information corresponding to each position in the space and a likelihood value for each target object in each position in the space based on the captured images data, the camera parameters, and the likelihood value corresponding to the pixels in each captured image for each target object.

12 Claims, 10 Drawing Sheets

510
511

520
522

530
531

540
542

550
551

560
562

INFORMATION PROCESSING APPARATUS, INFORMATION PROCESSING METHOD AND STORAGE MEDIUM

BACKGROUND

Field

The present disclosure relates to an information processing technique of modeling a target space.

Description of the Related Art

There is a technique of estimating a radiance field relating to an object present in a target space based on a plurality of captured images (hereinafter referred to as "multi-viewpoint images") obtained by image capturing from different multiple viewpoints whose camera parameters are known. Hereinafter, a target space whose radiance field is estimated is described as a "scene" and is explained. Further, there is a technique of generating, by using the estimated radiance field, an image (hereinafter referred to as "virtual viewpoint image") corresponding to a view in a case where an object is viewed from any virtual viewpoint (hereinafter referred to as "virtual viewpoint"). "NeRF: Representing Scenes as Neural Radiance Fields for View Synthesis" (hereinafter referred to as "non-patent document 1") discloses a technique of estimating a radiance field to represent the color and volume density of an object to a position and an orientation in a scene by deep learning by using the multi-viewpoint images as a teacher. Further, non-patent document 1 discloses a technique of determining the pixel value of a virtual viewpoint image by multiplying a color weighted by using volume density along a ray whose start point is a position of any viewpoint based on the estimated radiance field.

Further, there is a technique of generating the virtual viewpoint image in which a representation of an object is edited, for example, targeting part of objects of a plurality of objects included in the scene and including only representations corresponding to the targeted objects in the virtual viewpoint image. Hereinafter, one or more targeted objects of the plurality of objects included in the scene are described as "target object(s)" and explained. "Learning Object-Compositional Neural Radiance Field for Editable Scene Rendering" (hereinafter referred to as "non-patent literature 2") discloses a technique of estimating a radiance field dedicated to an target object based on the multi-viewpoint images and a mask image for masking regions other than an image region corresponding to the target object in each the captured image, to which the technique disclosed in non-patent literature 1 is applied. Hereinafter, an image region corresponding to an object in a captured image is described as an "object region", and, in particular, an image region corresponding to an target object in a captured image is described as a "target object region" and explained.

Specifically, in the technique disclosed in non-patent literature 2 (hereinafter referred to as "conventional technique"), first, a radiance field relating to each target object and a radiance field relating to an entire scene including all objects present in the scene are estimated. Next, a more accurate radiance field relating to each target object is estimated by using the radiance field relating to each estimated target object and the radiance field relating to the entire scene. More specifically, in the conventional technique, by deep learning using, as a teacher, the multi-viewpoint images in which regions other than a target object region are masked by using the above mask image, a radiance field representing a color and volume density relating to only the target object is estimated. Further, by deep learning using the multi-viewpoint images before masking as a teacher, a radiance field representing a color and volume density relating to the entire scene is estimated. Furthermore, a more accurate radiance field relating to the target object is estimated by specifying a region in which the target object is to be shielded by another object by using these estimated radiance fields.

By using the conventional technique, radiance fields relating to a plurality of objects present in the scene may be individually expressed. Further, by changing the combination of radiance fields to be used for generating the virtual viewpoint image, an object present in a scene may be edited in different ways. For example, the virtual viewpoint image including only a representation of a target object may be generated by using only a radiance field relating to the target object.

In the conventional technique, it is necessary to estimate both the radiance field relating to each target object and the radiance field relating to the entire scene in order to estimate the radiance field relating to each target object with accuracy. Thus, there is a problem that the technique requires an enormous amount of computations or memories.

SUMMARY

Embodiments of the present disclosure provide a technique in which the amount of computation or memory usage in a case where a highly accurate radiance field relating to an target object is estimated may be reduced compared with the conventional technique.

An information processing apparatus according to the present disclosure comprises one or more hardware processors and one or more memories storing computer-executable instructions that are executable by the one or more hardware processors. The computer-executable instructions include instructions for obtaining data on a plurality of captured images obtained by capturing at least one object present in a predetermined space from a plurality of viewpoints and camera parameters corresponding to the plurality of viewpoints in a case of the capturing respectively; regarding at least one target object of the at least one object, obtaining, for each target object, information indicating a likelihood that an image formed on each pixel in each of the plurality of captured images is the at least one target object as a likelihood value corresponding to each pixel in each of the plurality of captured images; and estimating information on the predetermined space including color information corresponding to each position in the predetermined space and a likelihood value for each target object in each position in the predetermined space based on the data on the plurality of captured images, the camera parameters corresponding to the plurality of viewpoints respectively, and the likelihood value corresponding to each pixel in each of the plurality of captured images for each target object.

Further features of various embodiments will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

In Embodiment 1, information on a space modeled by function $F_\Theta$ of equation (1) below is estimated based on a multi-viewpoint images obtained by image capturing from a plurality of different viewpoints whose camera parameters are known and likelihood maps corresponding to respective captured images constituting the multi-viewpoints image.

$$F_\theta: (x, y, z, \theta, \varphi) \to (R, G, B, 0, L_1, L_2, \ldots, L_K) \qquad \text{equation (1)}$$

Here, (x, y, z) are coordinates indicating a position in a target space (scene), and (θ, φ) are parameters indicating an orientation in the scene. The symbols (R, G, B) are values (hereinafter referred to as "color values") indicating the color of an object defined by the position and the orientation in the scene, and R represents a value of red, G represents a value of green, and B represents a value of blue. The symbol σ represents the volume density of the object defined by the position in the scene, and $L_k$ (k=1, 2, . . . , K) represents a value of likelihood (hereinafter referred to as "likelihood value") on each of K target objects defined by the position in the scene.

The likelihood value $L_k$ according to Embodiment 1 is an index indicating how likely it is that an object is a kth target object in a case where the object is present. The function $F_\Theta$ formulated by equation (1) is a function outputting a color value, volume density, and a likelihood value on the target objects to the position and the orientation in the scene. Hereinafter, information combining a color value and volume density in the scene expressed by the function $F_\Theta$ is referred to as a "radiance field", and information on a likelihood value in the scene is referred to as a "likelihood field" likewise. For example, a virtual viewpoint image including only a representation of a particular object may be generated by visualizing an object present in the scene with an estimated radiance field and an estimated likelihood field.

<Hardware Configuration>

Figure 1:
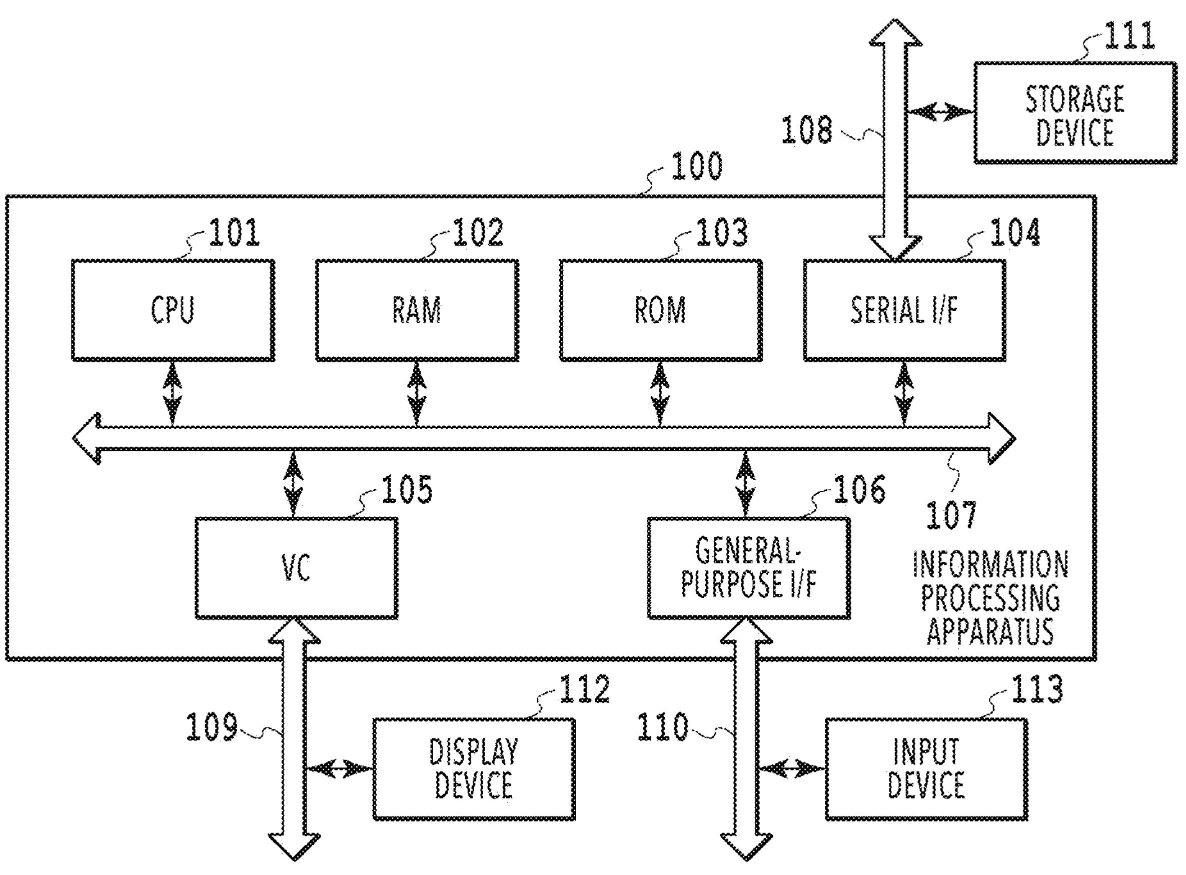
FIG. 1 is a block diagram showing an example of a hardware configuration of an information processing apparatus according to Embodiment 1.

FIG. 1 is a block diagram showing an example of a hardware configuration of an information processing apparatus 100 according to Embodiment 1. The information processing apparatus 100 has a CPU 101, a RAM 102, a ROM 103, a serial I/F (interface) 104, a VC (video card) 105, and a general-purpose I/F 106 as the hardware configuration. Each unit which the information processing apparatus 100 has as the hardware configuration is communicably connected through a system bus 107. The CPU 101 executes an OS (operating system) and various kinds of programs stored in the ROM 103 or a storage device 111, or the like while using the RAM 102 as a work memory. The CPU 101 controls the whole of the information processing apparatus 100 through the system bus 107 by executing the various kinds of programs. Incidentally, processes of steps shown in a flow chart mentioned below are implemented as a result of a program code stored in the ROM 103 or the storage device 111, or the like being expanded in the RAM 102 and the CPU 101 executing the program.

The serial I/F 104 is an interface formed by a serial ATA or the like and is connected to the information processing apparatus 100 and the storage device 111 through a serial bus 108. The storage device 111 is a storage device with a large capacity such as an HDD (hard disk drive) or an SSD (solid state drive). In Embodiment 1, the storage device 111 is explained on the premise that the storage device 111 is an external apparatus of the information processing apparatus 100, but the information processing apparatus 100 may include the storage device 111 inside. The VC 105 receives a control signal from the CPU 101 and outputs a signal on a display image to the display device 112 through a serial bus 109. The display device 112 is composed of a liquid crystal display or the like and displays the display image based on a signal on the display image output by the information processing apparatus 100. The general-purpose I/F 106 is connected to an input device 113, for example, a mouse or a keyboard through a serial bus 110 and receives an input signal from the input device 113.

The CPU 101 display a GUI (graphical user interface) provided by a program on the display device 112 through the VC 105 and receives an input signal indicating an instruction from a user obtained through the input device 113. The information processing apparatus 100 is implemented by a desktop PC (personal computer), for example. The information processing apparatus 100 may be implemented by a notebook PC which is integrated with the display device 112 or a tablet PC, or the like. Further, the storage device 111 may be implemented by a medium (portable storage medium), and a drive for accessing the medium such as a disk drive or a reader such as a memory card reader, or the like. For the medium, an FD (flexible disk), a CD-ROM, a DVD, a USB memory, an MO, or a flash memory, or the like may be used.

<Logical Configuration>

Figure 2:
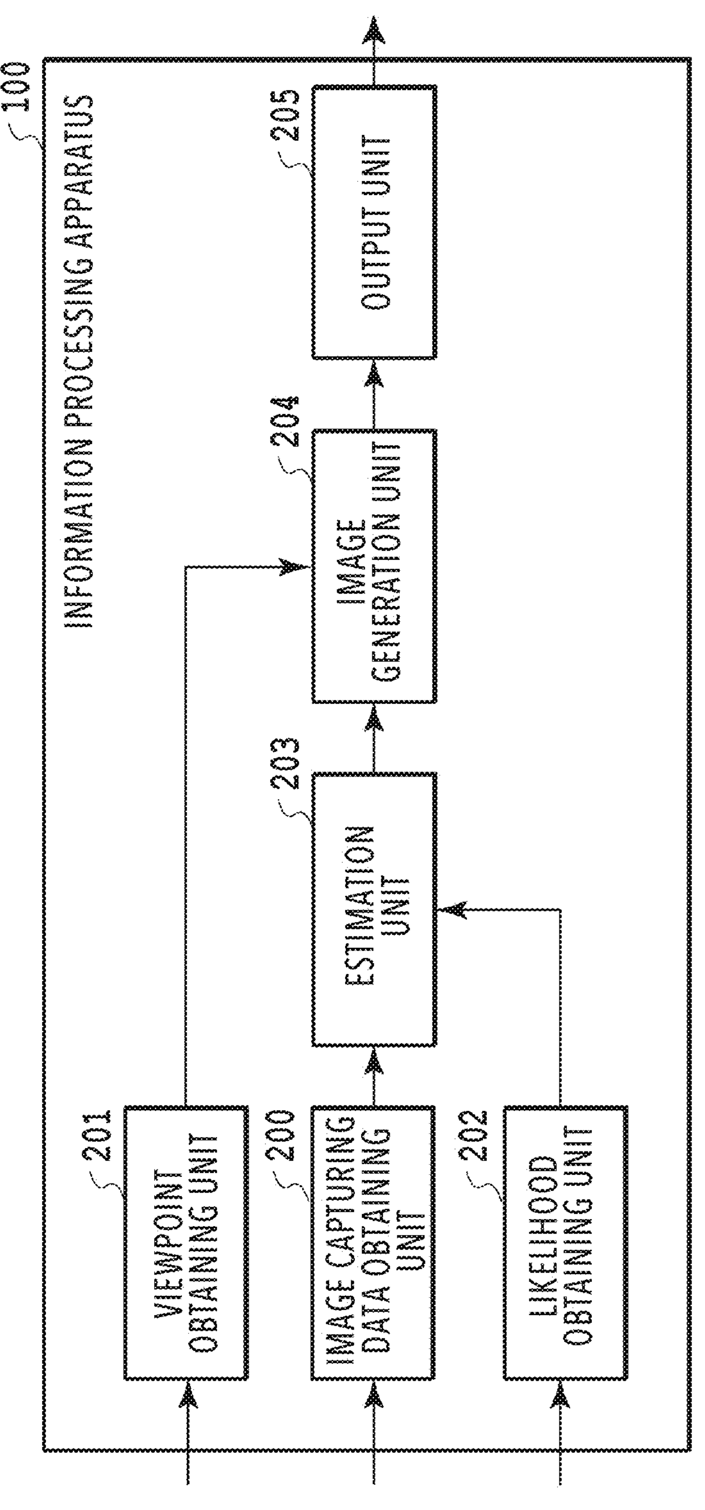
FIG. 2 is a block diagram showing an example of a logical configuration of the information processing apparatus according to Embodiment 1.

FIG. 2 is a block diagram showing an example of a logical configuration of the information processing apparatus 100 according to Embodiment 1. The information processing apparatus 100 has an image capturing data obtaining unit 200, a viewpoint obtaining unit 201, a likelihood obtaining unit 202, an estimation unit 203, an image generation unit 204, and an output unit 205 as the logical configuration. Each unit which the information processing apparatus 100 has as the logical configuration is achieved as a result of the CPU 101 executing a program stored in the ROM 103 or the like by using the RAM 102 as a work memory. Incidentally, not all processes shown below need to be performed by the CPU 101, and the image processing apparatus 100 may be configured in such a way that part of or all of the processes are performed by one or more processing circuits other than the CPU 101.

The image capturing data obtaining unit 200 obtains multiple pieces of captured image (multi-viewpoint images) data obtained by capturing an object present in a predetermined scene from positions of various viewpoints based on an instruction from a user input through the input device 113. Hereinafter, the captured image data obtained by the image capturing data obtaining unit 200 is explained on the premise that image data is in the form of an RGB image. The image capturing data obtaining unit 200 may directly obtain captured image data to be output by an image capturing apparatus from the image capturing apparatus and may obtain the captured image data by reading the captured image data from the storage device 111 or the like in which the captured image data is stored in advance. The multi-viewpoint images data obtained by the image capturing data obtaining unit 200 is sent to the estimation unit 203.

Figure 3:
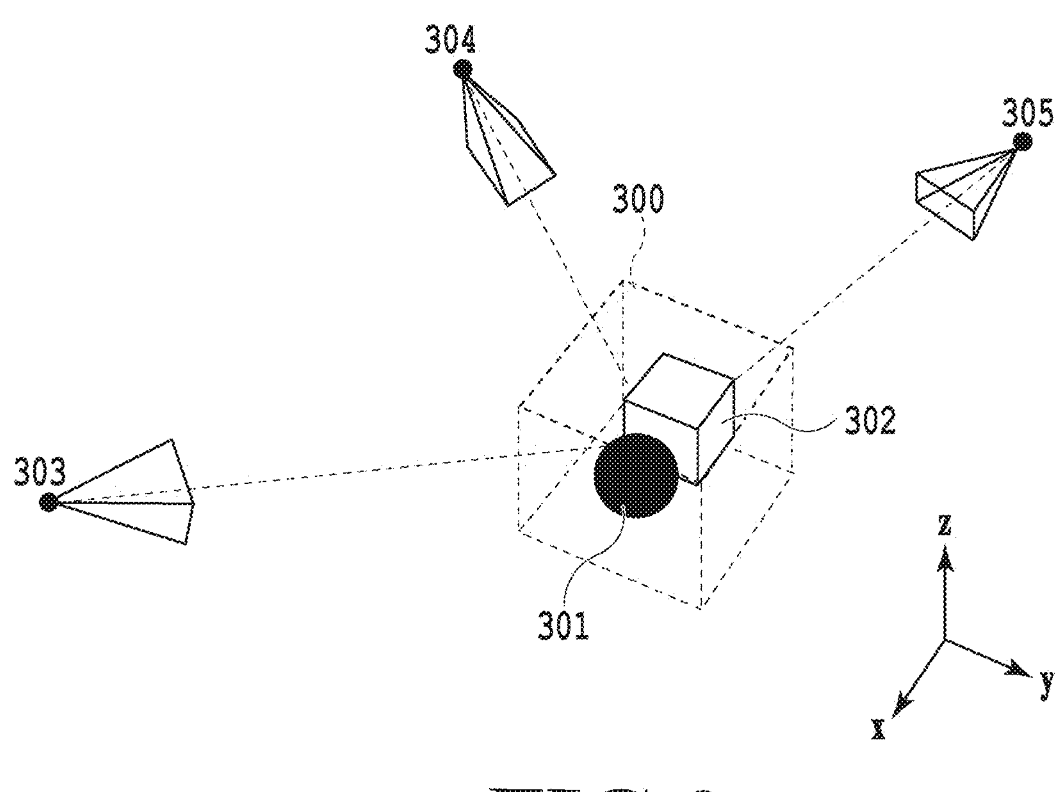
FIG. 3 is a diagram showing an example of the arrangements of an object and an image capturing apparatus according to Embodiment 1.

FIG. 3 is a diagram showing an example of the arrangements of objects 301 and 302 and image capturing apparatuses 303 to 305 according to Embodiment 1. FIG. 3 shows an example in which the object 301 in a spherical shape and the object 302 in a cubic shape are arranged as objects present in a predetermined scene 300 and a plurality (three) of the image capturing apparatuses 303 to 305 are arranged around the objects 301 and 302 as an example.

Figure 4A:
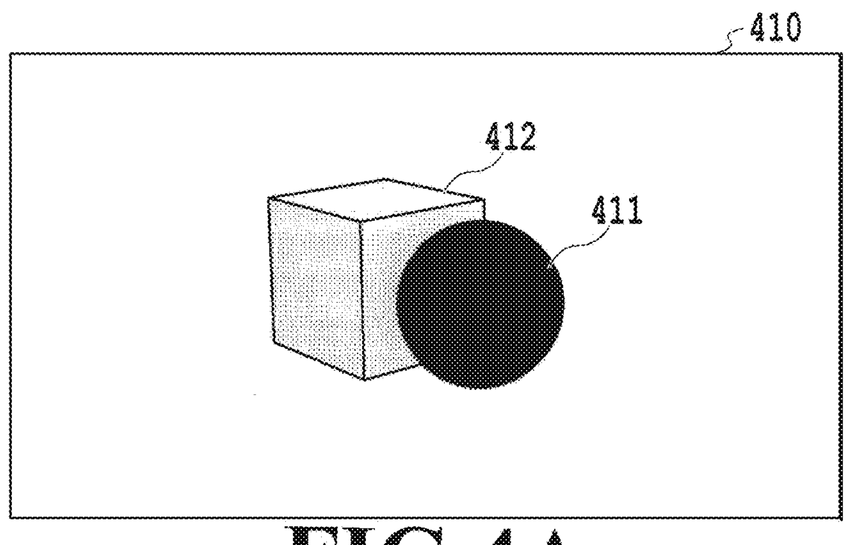
FIGS. 4A to 4C are diagrams showing an example of a captured image according to Embodiment 1.
Figure 4B:
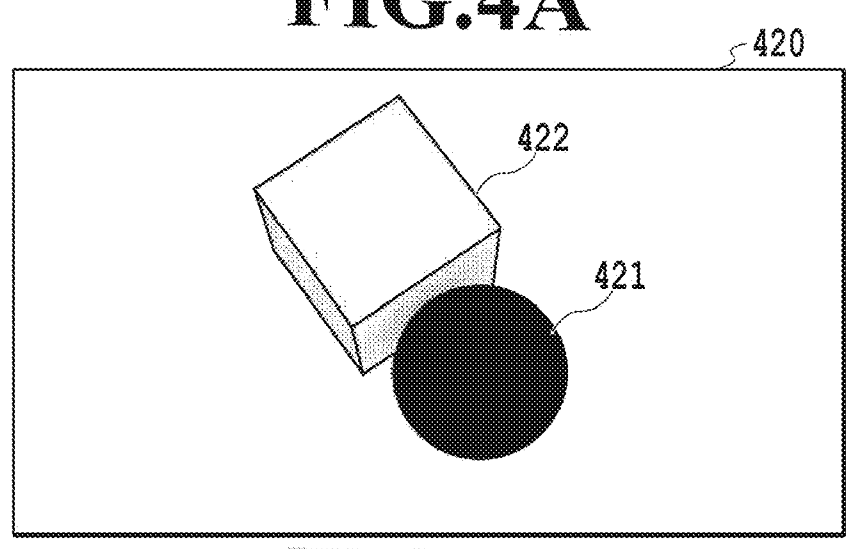
Figure 4C:
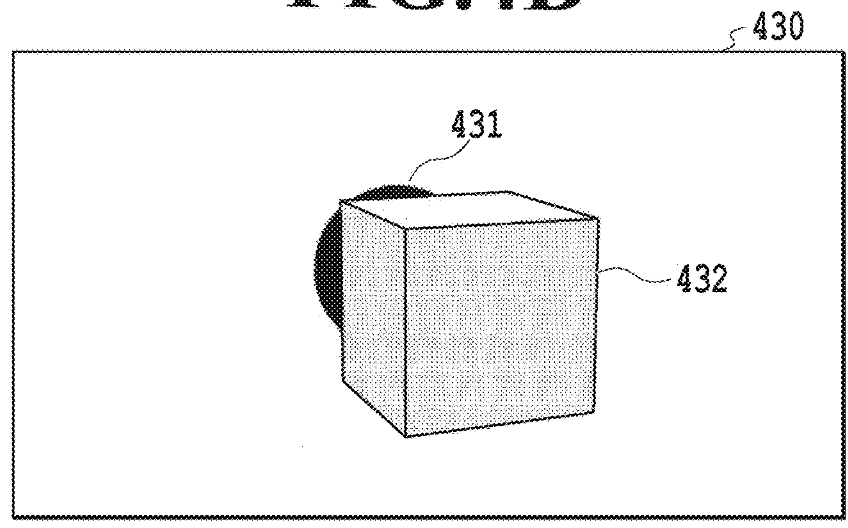

FIGS. 4A to 4C are diagrams showing an example of captured images 410, 420, and 430 obtained by image capturing performed by the image capturing apparatuses 303 to 305, respectively. Specifically, FIG. 4A shows an example of the captured image 410 obtained by image capturing performed by the image capturing apparatus 303. FIG. 4B shows an example of the captured image 420 obtained by image capturing performed by the image capturing apparatus 304. Further, FIG. 4C shows an example of the captured image 430 obtained by image capturing performed by the image capturing apparatus 305. The captured images 410, 420, and 430 include representations 411, 421, 431 of the object 301 in the spherical shape respectively and include representations 412, 422, and 432 of the object 302 in the cubic shape respectively.

Further, the image capturing data obtaining unit 200 obtains a camera parameter of image capturing apparatuses which capture captured images constituting the multi-viewpoint images. Hereinafter, the camera parameter is explained on the premise that the camera parameter obtained by the image capturing data obtaining unit 200 includes an internal parameter, an external parameter, and a distorted parameter of the image capturing apparatus. The internal parameter is a parameter representing the position of a principal point of an image capturing apparatus and a focal length of a lens of the image capturing apparatus. The external parameter is a parameter representing the position of the image capturing apparatus and an optical axis direction of the image capturing apparatus, that is, the orientation of the image capturing apparatus. The distortion parameter is a parameter representing distortion of the lens of the image capturing apparatus. The image capturing data obtaining unit 200 may obtain camera parameters held by the respective image capturing apparatuses by making a request to the image capturing apparatuses and may obtain camera parameters by reading the camera parameters from the storage apparatus 111 or the like in which the camera parameter is stored in advance. The camera parameters of the respective image capturing apparatuses obtained by the image capturing data obtaining unit 200 are sent to the estimation unit 203.

The viewpoint obtaining unit 201 obtains information on the virtual viewpoint (hereinafter referred to as "virtual viewpoint information"). The virtual viewpoint information at least includes a camera parameter as to the virtual viewpoint. The camera parameter as to the virtual viewpoint includes information indicating a position of the virtual viewpoint and information indicating a viewing direction in the virtual viewpoint. Hereinafter, in order to distinguish the camera parameter of the image capturing apparatus from that of the virtual viewpoint, the camera parameter of the image capturing apparatus is simply described as "camera parameter" and is explained, and the camera parameter as to the virtual viewpoint is described as "virtual camera parameter" and is explained. The virtual viewpoint information may include, in addition to the virtual camera parameter, number-of-pixel information indicating the number of pixels of the virtual viewpoint image generated by the image generation unit 204 and object information such as an identification number which may uniquely identify an object to be included as a representation in the virtual viewpoint image. Further, the virtual viewpoint information may include information indicating an angle of view from the virtual viewpoint, or the like. For example, the virtual viewpoint information is obtained based on an instruction input through the input device 113 from the user. The virtual viewpoint information obtained by the viewpoint obtaining unit 201 is sent to the image generation unit 204.

The likelihood obtaining unit 202 obtains data on the likelihood map (hereinafter referred to as "likelihood map data") for each target object based on an instruction input through the input device 113 from the user. In Embodiment 1, the likelihood map is an image having a value of likelihood (likelihood value) that an image formed on each pixel of the captured image is one corresponding to the target object as a pixel value. Hereinafter, an explanation is made on the premise that the likelihood value may take a real number equal to 0 or more and equal to 1 or less. The likelihood map may be generated by applying a publically known segmentation technique to the captured image. A generating method of the likelihood map is not limited to this. For example, the likelihood map may be created as a result of an input of a manual operation performed by the user filling a region corresponding to the target object in the captured image with a pixel value equivalent to the likelihood value. The likelihood map data obtained by the likelihood obtaining unit 202 is sent to the estimation unit 203.

Figures 5A, 5B, 5C, 5D, 5E, 5F:
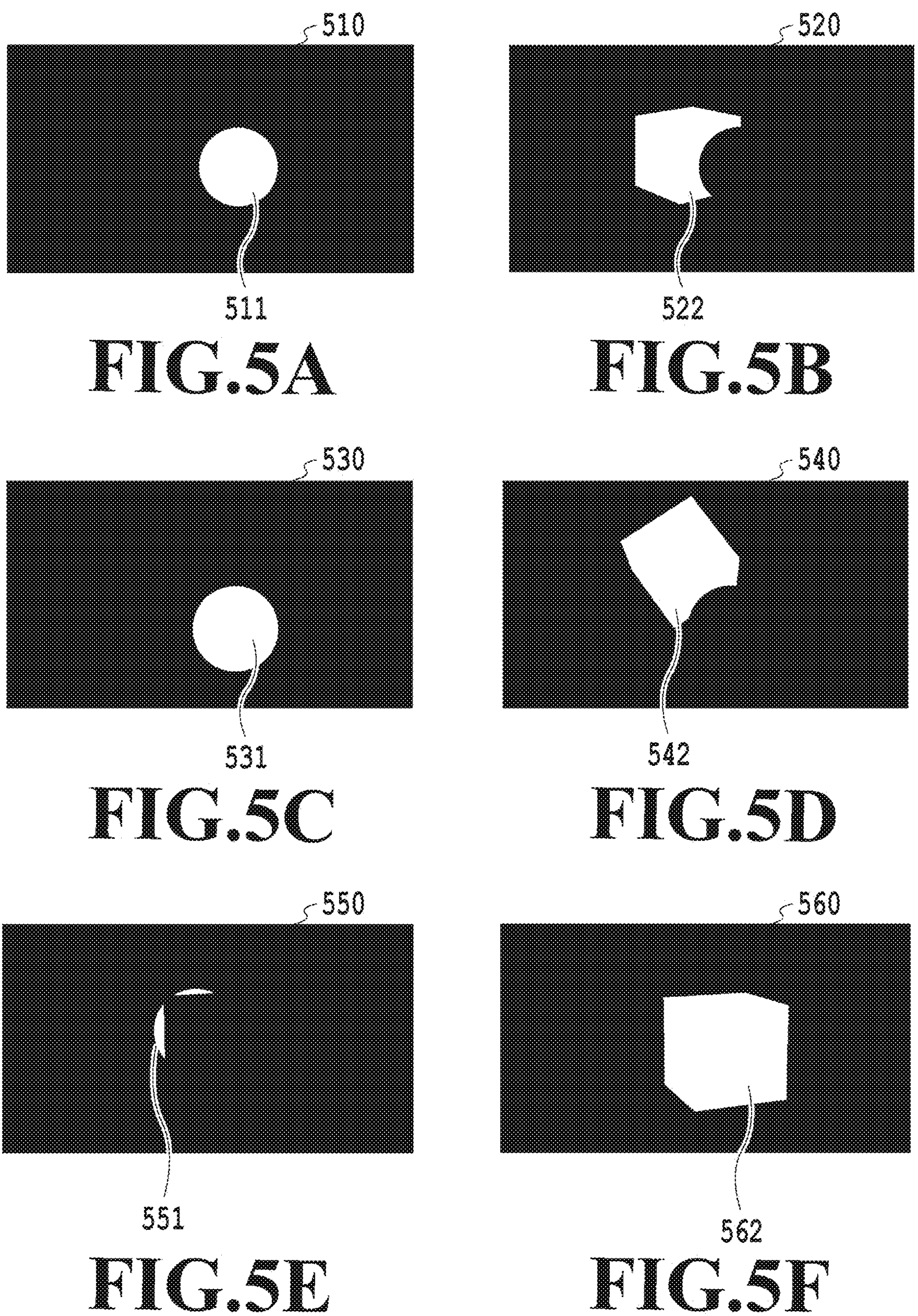
FIGS. 5A to 5F are diagrams showing an example of a likelihood map according to Embodiment 1.

FIGS. 5A to 5F are diagrams showing an example of likelihood maps 510, 520, 530, 540, 550, and 560 according to Embodiment 1. Specifically, FIGS. 5A and 5B show an example of the likelihood maps 510 and 520 corresponding to the captured image 410 shown in FIG. 4A. FIGS. 5C and 5D show an example of the likelihood maps 530 and 540 corresponding to the captured image 420 shown in FIG. 4B. FIGS. 5E and 5F show an example of the likelihood maps 550 and 560 corresponding to the captured image 430 shown in FIG. 4C. Incidentally, FIGS. 5A to 5F express a pixel whose likelihood is 0 in black and a pixel whose likelihood is 1 in white as an example. More specifically, the likelihood maps 510, 520, and 530 indicate the likelihood of the object 301 in the spherical shape in each pixel of the captured images 410, 420 and 430. Further, the likelihood maps 520, 540, and 560 indicate the likelihood of the object 302 in the cubic shape in each pixel of the captured images 410, 420, and 430.

The estimation unit 203 estimates the radiance field and the likelihood field based on the multi-viewpoint images data and the camera parameter obtained by the image capturing data obtaining unit 200 and the likelihood map data for each target object corresponding to the captured images obtained by the likelihood obtaining unit 202. Details on processes of the estimation unit 203 are described later. Information indicating the radiance field and the likelihood field estimated by the estimation unit 203 is sent to the image generation unit 204. The image generation unit 204 generates a virtual viewpoint image by using the radiance field and the likelihood field estimated by the estimation unit 203 based on the virtual viewpoint information obtained by the viewpoint obtaining unit 201. Details on processes of the image generation unit 204 are described later. Data on the virtual viewpoint image generated by the image generation unit 204 is sent to the output unit 205.

The output unit 205 outputs the virtual viewpoint image generated by the image generation unit 204. Specifically, for example, the output unit 205 generates a display image including the virtual viewpoint image and outputs a signal as to the display image to the display device 112 to display the display image on the display device 112. The destination of the virtual viewpoint image is not limited to the display device 112. For example, the output unit 205 may output data on the virtual viewpoint image to the storage device 111 and cause the storage device 111 to store the data or may output the data to other external devices different from the information processing apparatus 100.

<Processing Flow>

Figure 6:
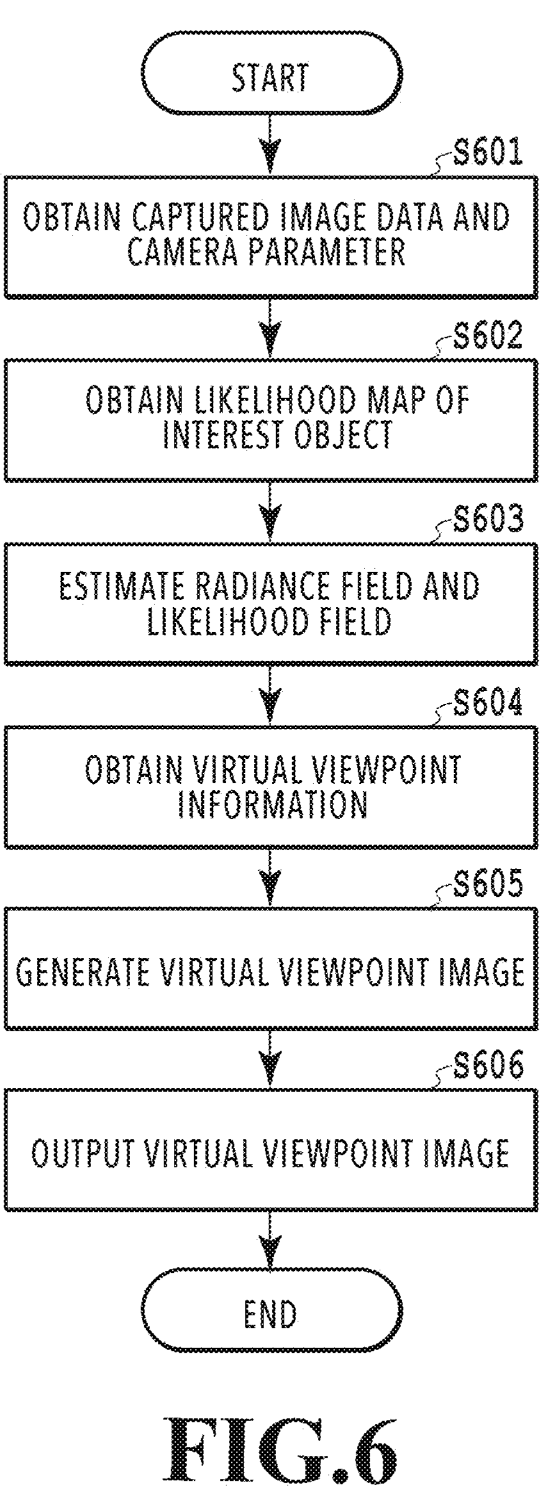
FIG. 6 is a flow chart showing an example of a processing flow of the information processing apparatus according to Embodiment 1.

FIG. 6 is a flow chart indicating an example of a processing flow in the information processing apparatus 100 according to Embodiment 1. Incidentally, the symbol "S" added to the head of a reference numeral means a step. First, in S601, the image capturing data obtaining unit 200 obtains multi-viewpoint images data and camera parameters corresponding to the respective captured images based on an instruction from the user. Next, in S602, the likelihood obtaining unit 202 obtains the likelihood map data for each target object corresponding to pieces of captured image data constituting the multi-viewpoint images data based on an instruction from the user.

Figures 7A, 7B, 7C:
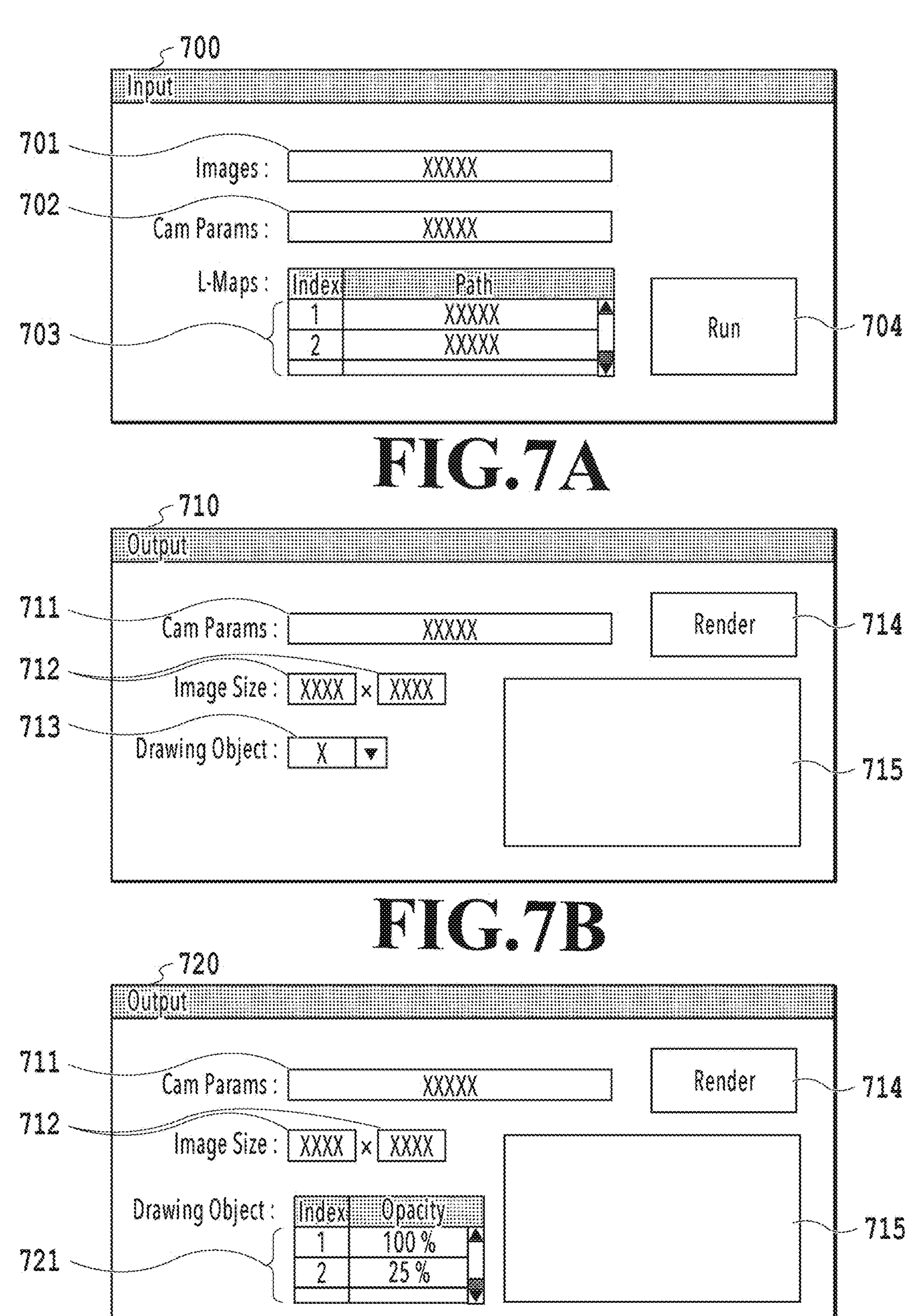
FIGS. 7A and 7B are diagrams showing an example of a GUI according to Embodiment 1.
FIG. 7C is a diagram showing an example of a GUI displayed on a display device according to Embodiment 2.

FIGS. 7A and 7B are diagrams showing an example of GUIs 700 and 710 displayed on the display device 112 according to Embodiment 1. The instructions from the user in S601 and S602 are accepted through the GUI 700 shown in FIG. 7A as an example. The GUI 700 has data path setting fields 701 to 703 and a "Run" button 704. The data path setting fields 701, 702, and 703 are, in the order named, fields accepting an input of a data path indicating the location of a file including the multi-viewpoint images data, the camera parameter data, and the likelihood map data as data. The "Run" button 704 is a button accepting an instruction of the execution of an estimation process to be described later. In a case where the button 704 is pressed by the user, the information processing apparatus 100 executes the process of S603 after the execution of the processes of S601 and S602. FIG. 7B is described later. Further, FIG. 7C is explained in Embodiment 2.

In S603, the estimation unit 203 performs the estimation process in which the radiance field and the likelihood field are estimated based on the multi-viewpoint images data and the camera parameter obtained in S601 and the likelihood map obtained in S602. Specifically, for example, the above-mentioned function $F_\Theta$ is formed by MLP (Multi-layer perceptron) in advance, and the estimation unit 203 estimates the radiance field and the likelihood field by learning about the MLP by deep learning. Hereinafter, the function $F_\Theta$ formed by the MLP is described as an "estimation MLP". In a case where the function $F_\Theta$ is formed as the estimation MLP, the radiance field and the likelihood field are expressed as estimation MLP parameters, that is, weighted coefficients of nodes forming the estimation MLP.

In learning of the estimation MLP, the parameter of the estimation MLP is optimized in such a way that a predict RGB value which is a prediction value of a pixel value calculated based on the output of the function $F_\Theta$ and a prediction likelihood value which is a prediction value of a likelihood value corresponding to the pixel are substantially equal to pixel values of the captured image and the likelihood map. Specifically, learning of the estimation MLP is performed by error backpropagation by using, as a loss, a squared Euclidean distance between a teacher signal $C_{GT}(r)$ shown in equation (2) below and a prediction signal $C_{pred}(r)$ calculated by equations (3) to (6) below from the output value of the function $F_\Theta$.

$$C_{GT}(r) = \begin{pmatrix} I_R(r) \\ I_G(r) \\ I_B(r) \\ I_{L1}(r) \\ I_{L2}(r) \\ \vdots \\ I_{LK}(r) \end{pmatrix} \quad \text{formula (2)}$$

$$C_{pred}(r) = \sum_{i=1}^{N} T_i \alpha_i c_i \quad \text{formula (3)}$$

$$T_i = \exp\left(-\sum_{j=1}^{i-1} \sigma_j \delta_j\right) \quad \text{formula (4)}$$

$$\alpha_i = 1 - \exp(-\sigma_i \delta_i) \quad \text{formula (5)}$$

$$c_i = \begin{pmatrix} R_i \\ G_i \\ B_i \\ L_{1,i} \\ L_{2,i} \\ \vdots \\ L_{K,i} \end{pmatrix} \quad \text{formula (6)}$$

Figure 8:
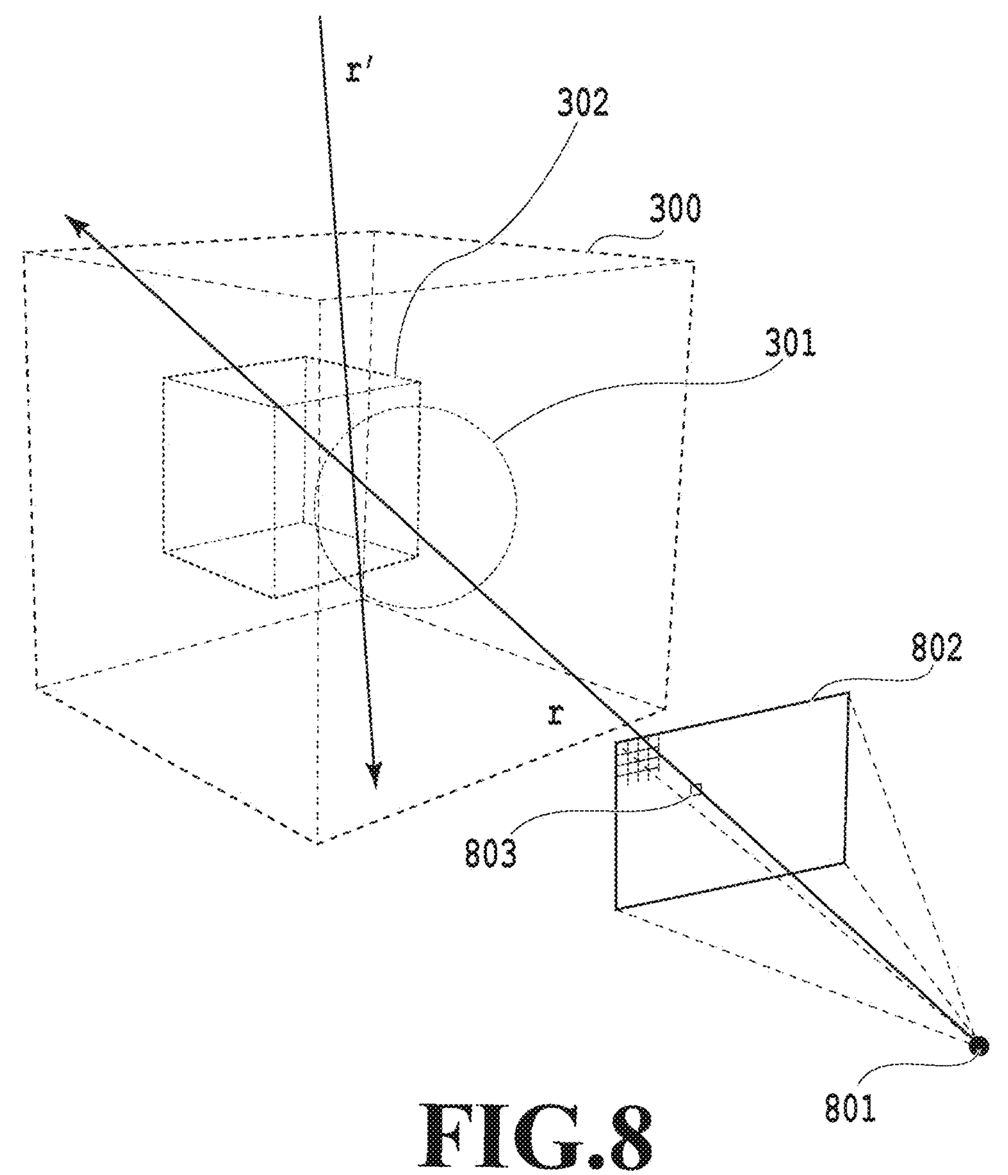
FIG. 8 is a diagram showing an example of a ray according to Embodiment 1.

Here, r is a ray defined based on the camera parameter of the image capturing apparatus. Further, $I_R(r)$, $I_G(r)$, and $I_B(r)$ are pixel values of the captured image corresponding to the ray r and are, in the order named, pixel values corresponding to components R (red), G (green) and B (blue). Further, $I_{Lk}(r)$ (k=1, 2, . . . , K) is a pixel value of the likelihood map as to the kth target object corresponding to the ray r. FIG. 8 is a diagram showing an example of the ray r according to Embodiment 1. FIG. 8 schematically expresses the positional relation among the ray r, the predetermined scene 300 in which the objects 301 and 302 are arranged, the position 801 of the image capturing apparatus, and a planar surface 802 corresponding to the captured image, and a pixel 803 in the captured image corresponding to the ray r.

Equations (3) to (5) formulate a process equivalent to a publically known volume rendering. i denotes an index of a sampling point on the ray r. N denotes the number of sampling points. Further, Ti denotes accumulated transmittance from the position 801 of the image capturing apparatus to the sampling point. $\alpha_i$ denotes the opacity of the sampling point. Furthermore, oi denotes volume density output by the function $F_\Theta$ for the sampling point di denotes a distance from the jth sampling point to the j+1th sampling point. In addition, ci denotes a signal composed of the RGB value and the likelihood value output by the function $F_\Theta$ for the sampling point, and $R_i$, $G_i$, and $B_i$ in equation (6) denote, in the order named, values corresponding to the components R, G, and B output by the function $F_\Theta$. Further, $L_{k,i}$ (k=1, 2, . . . , K) denotes a likelihood value as to the kth target object output from the function $F_\Theta$. Prediction signal $C_{pred}(r)$ obtained by equation (3) denotes a signal composed of the weighted sum of a color value and a likelihood value in the sampling point on the ray r which are weighted with the accumulated transmittance and the opacity as weighted coefficients.

Figure 9A:
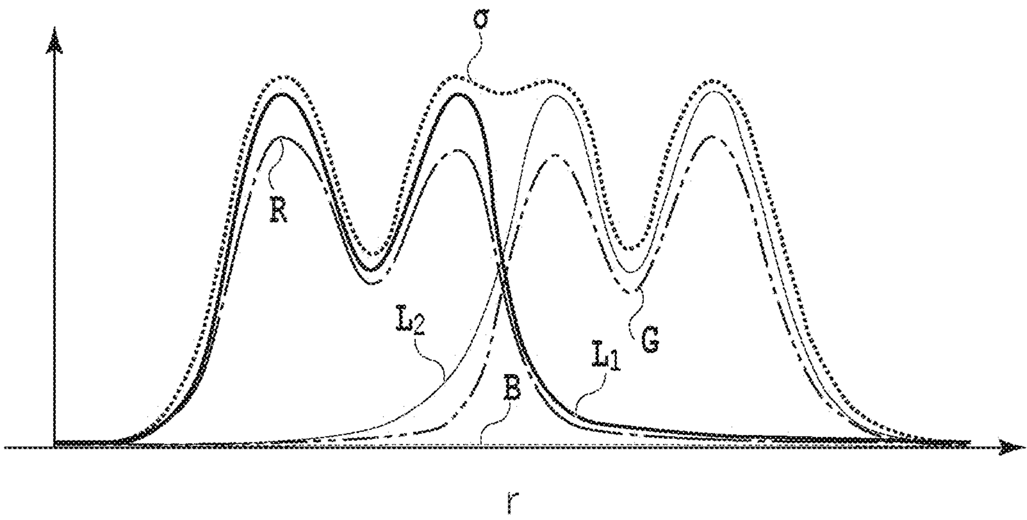
FIGS. 9A and 9B are diagrams showing an example of a radiance field and a likelihood field estimated by an estimation unit according to Embodiment 1.
Figure 9B:
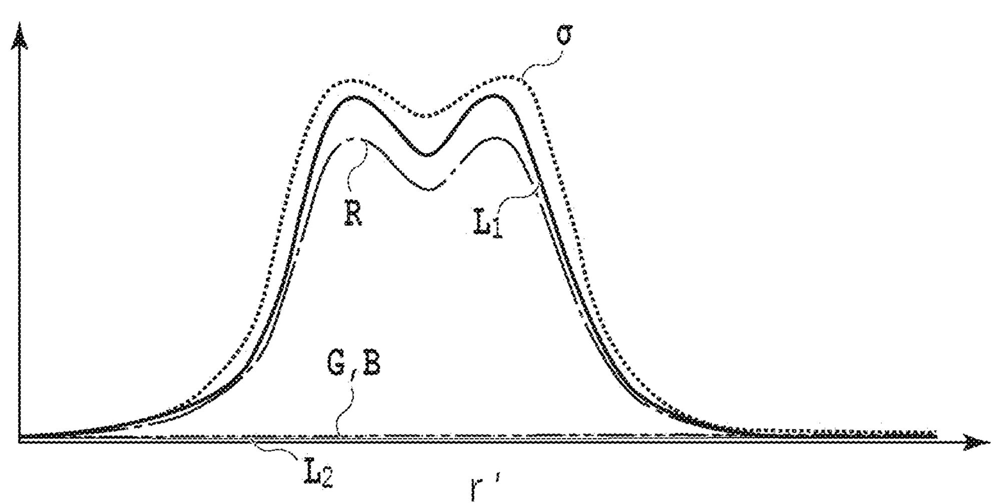

FIGS. 9A and 9B are diagrams showing an example of the radiance field and the likelihood field obtained by learning performed by the estimation unit 203 according to Embodiment 1. Specifically, FIGS. 9A and 9B are graphs on which output values of the function $F_\Theta$ are, in the order named, plotted along the ray r and a ray r' shown in FIG. 8. Here, the ray r is a ray passing both the object 301 in the spherical shape and the object 302 in the cubic shape, and the ray r' is a ray passing only the object 301 in the spherical shape. Hereinafter, the object 301 in the spherical shape is explained on the premise that at least the surface of the object 301 in the spherical shape is red, and the object 302 in the cubic shape is explained on the premise that at least the surface of the object 302 in the cubic shape is green. Further, hereinafter, the object 301 in the spherical shape is a first target object, is explained on the premise, and the object 302 in the cubic shape is a second target object, is explained on the premise.

The value of R in FIGS. 9A and 9B becomes a large value near a position in which the ray r and the ray r' intersect the surface of the object 301 in the spherical shape whose surface is red and becomes a small value near a position in which the ray r and the ray r' intersect the surface of the object 302 in the cubic shape whose surface is green. Further, the value of G in FIGS. 9A and 9B becomes a small value near a position in which the ray r and the ray r' intersect the surface of the object 301 in the spherical shape and becomes a large value near a position in which the ray r and the ray r' intersect the surface of the object 302 in the cubic shape. Furthermore, the value of B in FIGS. 9A and 9B entirely becomes a small value in positions including the ones near the positions in which the ray r and the ray r' intersect the surface of the object 301 in the spherical shape and the surface of the object 302 in the cubic shape.

In addition, the value of $\sigma$ denoting the volume density of the objects in FIGS. 9A and 9B becomes a large value near a position in which the ray r and the ray r' intersect the surface of the object 301 in the spherical shape or the surface of the object 302 in the cubic shape. Further, the value of $L_1$ denoting the likelihood of the first target object in FIGS. 9A and 9B becomes a large value near a position in which the ray r and the ray r' intersect the surface of the object 301 in the spherical shape which is the first target object. Furthermore, the value of $L_2$ denoting the likelihood of the second target object in FIGS. 9A and 9B becomes a large value near a position in which the ray r intersects the surface of the object 302 in the cubic shape which is the second target object.

Incidentally, a plurality of different target objects do not overlap each other in the same position in the scene 300. Further, in the learning in the estimation unit 203, performing learning in such a way that the total of the k likelihood value $L_{k,i}$ is 1 or less may be provided as a constraining condition. Further, the function $F_\Theta$ has only to be a function outputting a likelihood value as to a color value, volume density, and an target object to the position and the orientation in the scene 300 and is not limited to what is formed by the MLP.

After S603, in S604, the viewpoint obtaining unit 201 obtains virtual viewpoint information based on an instruction from the user. Next, in S605, the image generation unit 204 performs an image generation process in which a virtual viewpoint image is generated by using the virtual viewpoint information obtained in S604 and the radiance field and the likelihood field estimated in S603. The instruction from the user in S604 is accepted through the GUI 710 displayed on the display device 112 shown in FIG. 7B as an example.

The GUI 710 has a virtual camera parameter setting field 711, an image size setting field 712, an object setting field 713, a "Render" button 714, and a display region 715. The virtual camera parameter setting field 711 is a field in which an input of a data path indicating the location of a file including a virtual camera parameter used for generating the virtual viewpoint image as data is accepted. The image size setting field 712 is a field in which an input of the number of pixels in a horizontal direction and the number of pixels in a vertical direction of the virtual viewpoint image to be generated is accepted. The object setting field 713 is a field in which an input of an identification number or the like corresponding to an target object to be included in the virtual viewpoint image as a representation is accepted. The "Render" button 714 is a button which accepts an instruction of the execution of the image generation process. In a case where the user presses the "Render" button 714, the image generation unit 204 generates the virtual viewpoint image based on input values input into the virtual camera parameter setting field 711, the image size setting field 712, and the object setting field 713. The display region 715 is a region in which the virtual viewpoint image generated by the image generation unit 204 is displayed.

The image generation unit 204 calculates a pixel value $C_k(r)$ of the virtual viewpoint image by using, for example, equations (7) to (9) below to generate the virtual viewpoint image.

$$C_k(r) = \sum_{i=1}^{N} T_{k,i}\alpha_{k,i}\begin{pmatrix} R_i \\ G_i \\ B_i \end{pmatrix} \quad \text{formula (7)}$$

$$T_{k,i} = \exp\left(-\sum_{j=1}^{i-1} L_{k,j}\sigma_j\delta_j\right) \quad \text{formula (8)}$$

$$\alpha_{k,i} = 1 - \exp(-L_{k,i}\sigma_i\delta_i) \quad \text{formula (9)}$$

Here, k in equations (7) to (9) is the identification number of the target object to be included in the virtual viewpoint image as a representation and an identification number to be input into the object setting field 713. The image generation unit 204 weights volume density $\sigma_i$ by using likelihood value $L_{k,i}$ as to the target object to be included in the virtual viewpoint image as a representation in equations (8) and (9). Thereby, the image generation unit 204 may perform a pseudo reduction in the volume density of an target object having a small likelihood value $L_{k,i}$, that is, an target object not to be included in the virtual viewpoint image as a representation. Because of such a process, the virtual viewpoint image in which an target object other than the target object to be included in the virtual viewpoint image is transparent is generated, and the virtual viewpoint image including only a representation of the target object may be obtained.

Figure 10A:
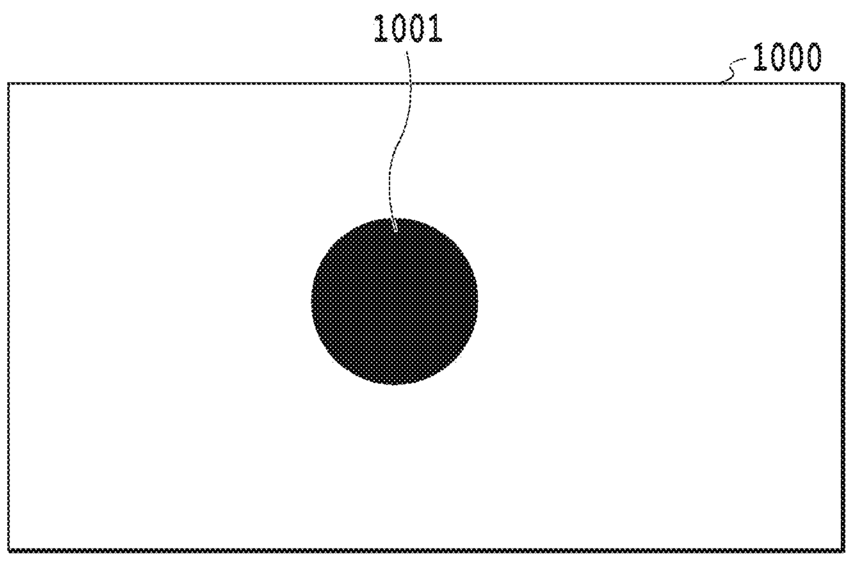
FIG. 10A is a diagram showing an example of a virtual viewpoint image generated by an image generation unit according to Embodiment 1.
Figure 10B:
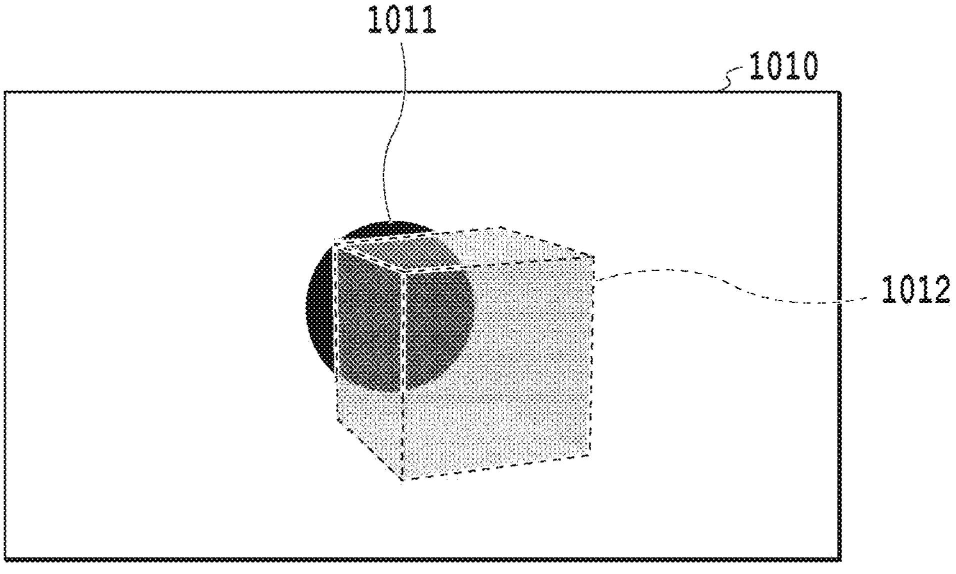
FIG. 10B is a diagram showing an example of a virtual viewpoint image generated by an image generation unit according to Embodiment 2.

FIG. 10A is a diagram showing an example of a virtual viewpoint image 1000 generated by the image generation unit 204 according to Embodiment 1. Specifically, FIG. 10A shows an example of the virtual viewpoint image 1000 in a case where a virtual camera parameter is the same as a camera parameter of the image capturing apparatus 305 shown in FIG. 3 and an identification number assigned to the object 301 in the spherical shape is input to the object setting field 713. Hereinafter, an explanation is made on the premise that "1" is assigned to the identification number of the object 301 in the spherical shape and "2" is assigned to the identification number of the object 302 in the cubic shape. In other words, FIG. 10A is an example of the virtual viewpoint image 1000 generated in a case where "1" which is the identification number assigned to the object 301 in the spherical shape is input into the object setting field 713. The virtual viewpoint image 1000 does not include a representation of the object 302 in the cubic shape, but includes only a representation of the object 301 in the spherical shape. A virtual viewpoint image 1010 shown in FIG. 10B is explained in Embodiment 2.

After S605, in S606, the output unit 205 outputs the virtual viewpoint image generated in S605. For example, the output unit 205 produces an output in such a way that the virtual viewpoint image generated in S605 is displayed on a display region 715 in the GUI 710. After S606, the information processing apparatus 100 ends the process in the flow chart shown in FIG. 6. Incidentally, in equations (8) and (9), volume density $\sigma_i$ is weighted by directly multiplying volume density $\sigma_i$ by a likelihood value $L_{k,i}$, but a way of weighting is not limited to this. For example, weighting may be performed by binarizing and turning the likelihood value $L_{k,i}$ into 0 or 1 based on a predetermined threshold and by multiplying the volume density $\sigma_i$ by the binarized likelihood value $L_{k,i}$.

As mentioned above, to the radiance field of the entire object and the likelihood field for each target object, the scene is modeled by using one function $F_\Theta$, and the information processing apparatus 100 is configured so as to learn this. The information processing apparatus 100 configured in this way may simultaneously learn the radiance field for each target object and estimate this. Thereby, learning, that is, the reduction of the amount of computations and memory usage required for estimating the radiance field for each target object may be achieved, and the virtual viewpoint image in which only a representation of a particular object in the scene is extracted may be generated.

Incidentally, in Embodiment 1, it is explained on the premise that the captured image is an image in the form of an RGB image, but the captured image may be expressed in other forms, for example, a grayscale image, an XYZ image, or a YUV image. Further, in Embodiment 1, the color of the object is explained on the premise that the color of the object is defined by the position and the orientation. However, the color of the object may be defined by only the position without depending on the orientation. Further, in the explanation about S604, an explanation is made of the example in which the virtual viewpoint image is generated in such a way that the representation of the kth target object becomes more transparent as the likelihood value of the kth target object of designated by the user is smaller, but a generating method of the virtual viewpoint image is not limited to this. For example, the virtual viewpoint image may be generated in such a way that a representation of the kth target object becomes more transparent as the likelihood value of the kth target object is larger. In this case, for example, the virtual viewpoint image in which the representation of the kth target object is removed is generated.

Embodiment 2

In Embodiment 1, an explanation is made of the example in which the radiant field and the likelihood field modeled by the function $F_\Theta$ of equation (1) are estimated. In Embodiment 2, an explanation is made of an aspect in which a radiance field and a likelihood field modeled by the function $F'_\Theta$ shown in equation (10) below and not including volume density are estimated and in which volume density is calculated based on the estimated likelihood value of each target object.

$$F'_\theta: (x, y, z, \theta, \varphi) \rightarrow (R, G, B, 0, L_1, L_2, \ldots, L_K) \qquad \text{equation (10)}$$

The function $F'_\theta$ formulated by equation (10) is a function outputting a color value and a likelihood value as to each target object to the position and the orientation of a scene and is different from the function Fe according to Embodiment 1 in that volume density is not output. In the explanations of Embodiment 2, color information in the scene expressed by the function $F'_\theta$ is referred to as the "radiance field".

A hardware configuration and a logical configuration of an information processing apparatus 100 (hereinafter simply referred to as "information processing apparatus 100") according to Embodiment 2 and the total flows of processes in the information processing apparatus 100 are equivalent to those of the information processing apparatus 100 according to Embodiment 1. However, the processes of the information processing apparatus 100 are different from those of the information processing apparatus 100 according to Embodiment 1 in the estimation process in S603 and in the image generation process in S605. Hereinafter, processes of Embodiment 2 which are different from those of Embodiment 1 are mainly explained. Incidentally, identical reference numbers are allocated to identical constituents to those of Embodiment 1, and an explanation is made below.

<Estimation Process in Estimation Unit According to Embodiment 2>

An estimation unit 203 of Embodiment 2 (hereinafter simply described as "estimation unit 230") estimates a radiance field and a likelihood field. Specifically, the estimation unit 203 estimates a radiance field and a likelihood field not including volume density based on multi-viewpoint images data, camera parameters corresponding to respective image capturing apparatuses, and pieces of likelihood map data for each target object corresponding to the captured images. The estimation unit 203 estimates that it is highly probable that an object is present in a position whose likelihood value output by the function $F'_\Theta$ is large in a case of estimating the radiance field and uses the sum of the likelihood values of the target objects as volume density. For example, the function $F'_{\Theta}$ of equation (10) is formed by an MLP. The estimation unit 203 performs learning of the MLP by error backpropagation by using, as a loss, a squared Euclidean distance between the teacher signal $C_{GT}(r)$ shown in equation (2) and a prediction signal $C_{pred}'(r)$ calculated by equations (11) to (16) below.

$$C'_{pred}(r) = \sum_{i=1}^{N} T'_i \alpha'_i c'_i \quad \text{formula (11)}$$

$$T'_i = \exp\left(-\sum_{j=1}^{i-1} \sigma'_j \delta_j\right) \quad \text{formula (12)}$$

$$\alpha'_i = 1 - \exp(-\sigma'_i \delta_i) \quad \text{formula (13)}$$

$$c'_i = \begin{pmatrix} R_i \\ G_i \\ B_i \\ L'_{1,i} \\ L'_{2,i} \\ \vdots \\ L'_{K,i} \end{pmatrix} \quad \text{formula (14)}$$

$$L'_{k,i} = \begin{cases} \dfrac{L_{k,i}}{\sigma'_i} & \text{if } \sigma'_i > 0 \\ L_{k,i} & \text{otherwise} \end{cases} \quad \text{formula (15)}$$

$$\sigma'_i = \sum_{k=1}^{K} L_{k,i} \quad \text{formula (16)}$$

Here, $T'_i$ denotes accumulated transmittance from the position of the image capturing apparatus to a sampling point. The symbol $\alpha'_i$ denotes the opacity of the sampling point. Further, $\sigma'_i$ denotes volume density calculated based on likelihood value $L_{k,i}$ output by the function $F'_{\Theta}$ to the sampling point. The symbol $L'_{k,i}$ denotes a value which is obtained by normalizing the likelihood value $L_{k,i}$ with volume density $\sigma'_i$. Furthermore, $c'_i$ is a signal composed of an RGB value output by the function $F'_{\Theta}$ to the sampling point and the likelihood value $L'_{k,i}$ after the normalization performed with the volume density $\sigma'_i$. Incidentally, in equation (16), as an example, the sum of the likelihood value $L_{k,i}$ is the volume density $\sigma'_i$, but the volume density $\sigma'_i$ has only to be a large value in a case where any one of likelihood values of K target objects is a likelihood value whose value is large. For example, a maximum of k likelihood values $L_{k,i}$ (k=1, 2, . . . , K) for sampling points may be volume density $\sigma'_i$.

<Image Generation Processing in Image Generation Unit of Embodiment 2>

An image generation unit 204 according to Embodiment 2 (hereinafter simply described as "image generation unit 204") generates the virtual viewpoint image in which only a representation of a particular object is extracted in the scene by performing a similar process to that of the image generation unit 204 of Embodiment 1. Specifically, the image generation unit 204 has only to obtain the pixel value $C_k(r)$ shown in equation (7) by replacing the likelihood value $L_{k,i}$ shown in equation (8) with the likelihood value $L'_{k,i}$ shown in equation (15) and by replacing the volume density $\sigma_i$ shown in equation (9) with the volume density $\sigma'_i$ shown in equation (16).

The image generation unit 204 may generate the virtual viewpoint image in which the opacity of a representation corresponding to an target object is changed for each target object by using the likelihood field estimated by the estimation unit 203. FIG. 7C is a diagram showing an example of a GUI 720 displayed on the display device 112 according to Embodiment 2. In this case, for example, the information processing apparatus 100 accepts an instruction from the user through the GUI 720 displayed on the display device 112 shown in FIG. 7C as an example. The GUI 720 has an opacity setting field 721 in addition to the virtual camera parameter setting field 711, the image size setting field 712, the "Render" button 714, and the display region 715. The opacity setting field 721 is a field in which an input of a coefficient $\beta_k$ (k=1, 2, . . . , K) as to the opacity of a representation of each target object in the virtual viewpoint image to be generated is accepted. In a case where the user presses the "Render" button 714, the image generation unit 204 generates the virtual viewpoint image based on input values input into the virtual camera parameter setting field 711, the image size setting field 712, and the opacity setting field 721. Specifically, for example, the image generation unit 204 determines a pixel value $C_{synth}(r)$ of the virtual viewpoint image to be generated by using equations (17) to (19) below.

$$C_{synth}(r) = \sum_{i=1}^{N} T''_i \alpha''_i \begin{pmatrix} R_i \\ G_i \\ B_i \end{pmatrix} \quad \text{formula (17)}$$

$$T''_i = \exp\left(-\sum_{j=1}^{i-1} \sum_{k=1}^{K} \beta_k L'_{k,j} \sigma'_j \delta_j\right) \quad \text{formula (18)}$$

$$\alpha''_i = 1 - \exp\left(-\sum_{k=1}^{K} \beta_k L'_{k,i} \sigma'_i \delta_i\right) \quad \text{formula (19)}$$

FIG. 10B is a diagram showing an example of the virtual viewpoint image 1010 generated by the image generation unit 204 of Embodiment 2. FIG. 10B shows an example of the virtual viewpoint image 1010 generated by the image generation unit 204 in a case where the coefficient $\beta_k$ as to the opacity of the representation of each target object in the virtual viewpoint image to be generated is set. Specifically, FIG. 10B is the virtual viewpoint image 1010 in a case where the virtual camera parameter is identical to the camera parameter of the image capturing apparatus 305 shown in FIG. 3. More specifically, FIG. 10B is the virtual viewpoint image 1010 in a case where the coefficient $\beta_1$ to the object 301 in the spherical shape is 1.00 and the coefficient $\beta_2$ to the object 302 in the cubic shape is 0.25. The coefficient $\beta_2$ to the object 302 in the cubic shape is 0.25, and thus a representation of the object 302 in the cubic shape included in the virtual viewpoint image 1010 is expressed as a state of being translucent.

As mentioned above, in Embodiment 2, the scene is modeled by using the function $F'_{\Theta}$ whose number of dimensions of outputs is less than that of the function $F_{\Theta}$ of Embodiment 1, and the information processing apparatus 110 is configured so as to learn this. The information processing apparatus 100 configured in this way may simultaneously learn and estimate the radiance field for each target object. Thereby, learning, that is, the reduction of the amount of computations and memory usage required for estimating the radiance field for each target object may be achieved, and the virtual viewpoint image in which a particular object in the scene is edited may be generated.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiments of the present disclosure can reduce the amount of computations or memory usage in a case where a radiance field with high accuracy as to an target object is estimated.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-209192, filed on Dec. 12, 2023, which is hereby incorporated by reference wherein in its entirety.

What is claimed is:

1. An information processing apparatus comprising:
one or more hardware processors; and
one or more memories storing computer-executable instructions that are executable by the one or more hardware processors, the computer-executable instructions including instructions for:
obtaining data on a plurality of captured images obtained by capturing at least one object present in a predetermined space from a plurality of viewpoints and camera parameters corresponding to the plurality of viewpoints in a case of the capturing respectively;
regarding at least one target object of the at least one object, obtaining information indicating a likelihood that an image formed on each pixel in each of the plurality of captured images is an image of the target object as a likelihood value corresponding to each pixel in each of the plurality of captured images for each target object; and
estimating information on the predetermined space including color information corresponding to each position in the predetermined space and a likelihood value for each target object in each position in the predetermined space based on the data on the plurality of captured images, the camera parameters corresponding to the plurality of viewpoints respectively, and the likelihood value corresponding to each pixel in each of the plurality of captured images for each target object.

2. The information processing apparatus according to claim 1, wherein
the information on the predetermined space is information indicating a function outputting the color information corresponding to each position in the predetermined space and the likelihood value for each target object in each position in the predetermined space.

3. The information processing apparatus according to claim 1, wherein
the color information corresponding to each position in the predetermined space is color information on a combination of a position and an orientation in the predetermined space.

4. The information processing apparatus according to claim 1, wherein the computer-executable instructions further include instructions for:
estimating information on the predetermined space further including volume density corresponding to each position in the predetermined space.

5. The information processing apparatus according to claim 4, wherein
the information on the predetermined space is information indicating the function outputting the color information corresponding to each position in the predetermined space, the likelihood value for each target object in each position in the predetermined space, and the volume density corresponding to each position in the predetermined space.

6. The information processing apparatus according to claim 4, wherein the computer-executable instructions further include instructions for:
calculating an error about a color by using the data on the plurality of captured images, the camera parameters corresponding to the plurality of viewpoints respectively, the color information corresponding to each position in the predetermined space obtained by estimating, and volume density obtained by at least one of estimating and calculating,
calculating an error about the likelihood value by using the likelihood value corresponding to the pixels in each of the plurality of captured images for each target object, the likelihood value for each target object in each position in the predetermined space obtained by estimating, and the volume density obtained by at least one of estimating and the calculating; and
estimating the information on the predetermined space by minimizing the error about the color and the error about the likelihood value obtained by calculating.

7. The information processing apparatus according to claim 1, wherein the computer-executable instructions further include instructions for:
calculating volume density corresponding to each position in the predetermined space based on the likelihood value obtained by estimating each target object in each position in the predetermined space.

8. The information processing apparatus according to claim 1, wherein the computer-executable instructions further include instructions for:
generating an image visualizing an object in the predetermined space based on the information on the predetermined space.

9. The information processing apparatus according to claim 8, wherein the computer-executable instructions further include instructions for:

displaying and outputting the generated image on and to a display device.

10. The information processing apparatus according to claim 8, wherein the computer-executable instructions further include instructions for:

generating the image in such a way that a color of a representation corresponding to the target object in the image becomes more transparent as the likelihood value of the target object in the predetermined space is smaller.

11. A method for processing information comprising the steps of:

obtaining data on a plurality of captured images obtained by capturing at least one object present in a predetermined space from a plurality of viewpoints and camera parameters corresponding to the plurality of viewpoints in a case of the capturing respectively;

regarding at least one target object of the at least one object, obtaining information indicating a likelihood that an image formed on each pixel in each of the plurality of captured images is the at least one target object as a likelihood value corresponding to each pixel in each of the plurality of captured images for each target object; and estimating information on the predetermined space including color information corresponding to each position in the predetermined space and a likelihood value for each target object in each position in the predetermined space based on the data on the plurality of captured images, the camera parameters corresponding to the plurality of viewpoints respectively, and the likelihood value corresponding to each pixel in each of the plurality of captured images for each target object.

12. A non-transitory computer-readable storage medium storing computer-executable instructions for causing a computer to perform a control method of an information processing apparatus, the control method comprising the steps of:

obtaining data on a plurality of captured images obtained by capturing at least one object present in a predetermined space from a plurality of viewpoints and camera parameters corresponding to the plurality of viewpoints in a case of the capturing respectively;

regarding at least one target object of the at least one object, obtaining information indicating a likelihood that an image formed on each pixel in each of the plurality of captured images is the at least one target object as a likelihood value corresponding to each pixel in each of the plurality of captured images for each target object; and estimating information on the predetermined space including color information corresponding to each position in the predetermined space and a likelihood value for each target object in each position in the predetermined space based on the data on the plurality of captured images, the camera parameters corresponding to the plurality of viewpoints respectively, and the likelihood value corresponding to each pixel in each of the plurality of captured images for each target object.

* * * * *